(12) United States Patent
Sikri et al.

(10) Patent No.: US 7,760,938 B1
(45) Date of Patent: Jul. 20, 2010

(54) ALGORITHM TO ENHANCE THE CONTRAST OF A MONOCHROME IMAGE

(75) Inventors: Vivek Ashwini Sikri, Cambridge, MA (US); Xiaofeng Michael Lu, Westford, MA (US)

(73) Assignee: Melexis Tessenderlo NV, Tessenderlo (BE)

( * ) Notice: Subject to any disclaimer, the term of this patent is extended or adjusted under 35 U.S.C. 154(b) by 943 days.

(21) Appl. No.: 11/248,035

(22) Filed: Oct. 11, 2005

Related U.S. Application Data

(60) Provisional application No. 60/617,756, filed on Oct. 12, 2004.

(51) Int. Cl.
G06T 5/40 (2006.01)

(52) U.S. Cl. ............ 382/169; 382/274

(58) Field of Classification Search ............ None
See application file for complete search history.

(56) References Cited

U.S. PATENT DOCUMENTS

| | | | | |
|---|---|---|---|---|
| 6,157,748 | A * | 12/2000 | Taleblou et al. | 382/288 |
| 7,382,414 | B2 * | 6/2008 | Nakajima et al. | 348/625 |
| 7,415,155 | B2 * | 8/2008 | Shi et al. | 382/169 |
| 2003/0012437 | A1 * | 1/2003 | Zaklika et al. | 382/169 |
| 2004/0190789 | A1 * | 9/2004 | Liu et al. | 382/274 |

* cited by examiner

*Primary Examiner*—Jon Chang
(74) *Attorney, Agent, or Firm*—Gauthier & Connors LLP

(57) ABSTRACT

A method and apparatus for enhancing the contrast of an image. The method may include creating a histogram of an original image, determining output pixel values based on one or more thresholds that define a minimum number of pixels in each histogram bin, and correcting the original image using the output pixel values.

15 Claims, 12 Drawing Sheets

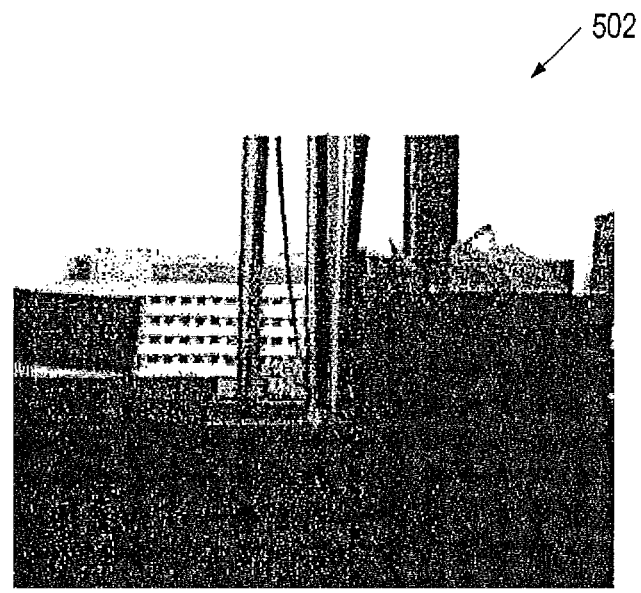
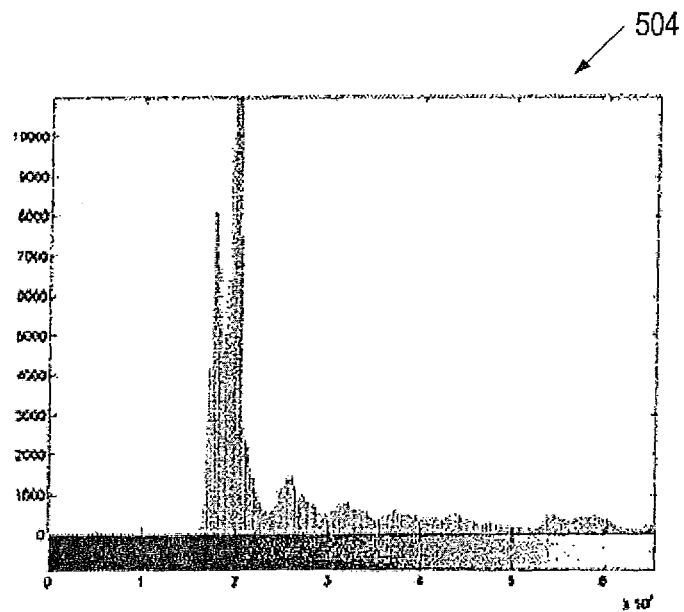
FIG. 5

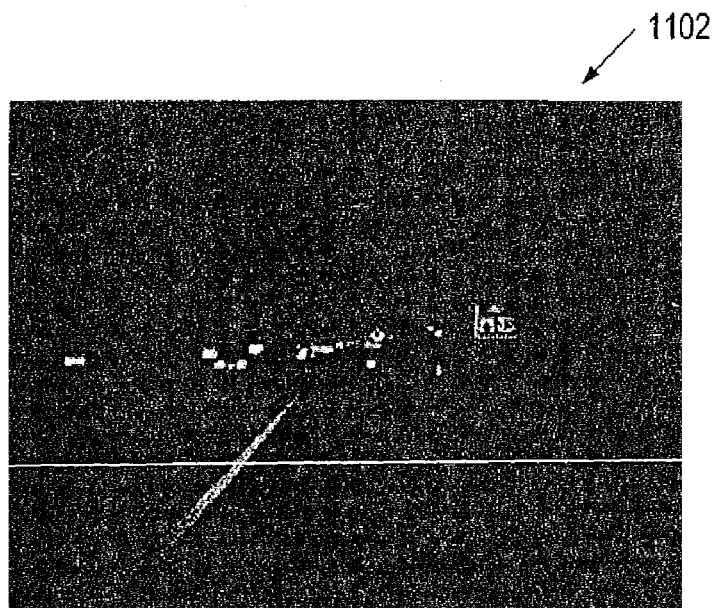
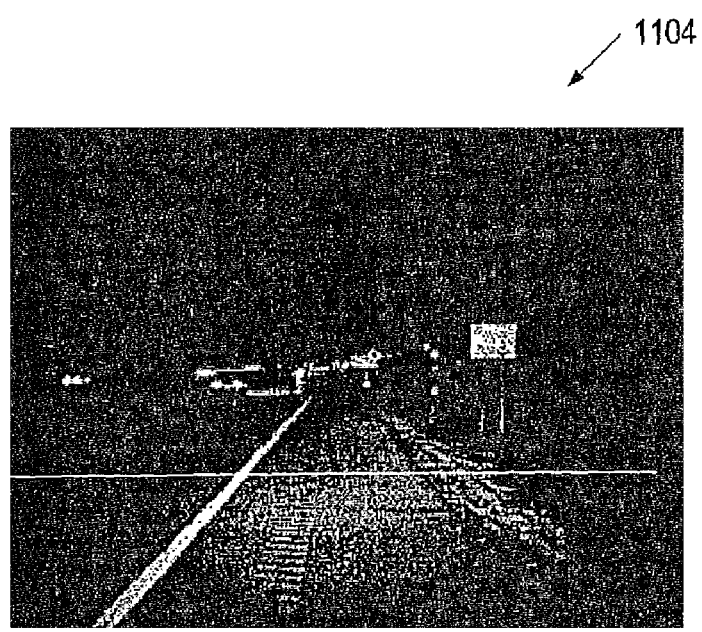
FIG. 11

ALGORITHM TO ENHANCE THE CONTRAST OF A MONOCHROME IMAGE

RELATED APPLICATIONS

This application is related to and claims the benefit of U.S. Provisional Patent application Ser. No. 60/617,756 filed Oct. 12, 2004, which is hereby incorporated by reference.

TECHNICAL FIELD

The present invention relates generally to electronic imaging and, more particularly, to enhancing the contrast of a monochrome image.

BACKGROUND

Video cameras may be used for different applications. For example, video cameras may be used for automotive applications such as forward collision warning and night vision applications that are targeted at scenes with a poor distribution of pixels across the graycode range. Night-time scenes, which are mostly dark but include a few headlights, and scenes, which are part indoor and part outdoor, typically show a very poor distribution of graycodes.

There are several existing techniques that can be used to enhance the contrast of monochrome images. For example, Histogram Specification (HSp) is a common contrast enhancement technique that operates based on a predefined histogram. In particular, input pixels of an image are manipulated so that output pixel values match, as closely as possible, the predefined histogram. Histogram Equalization (HEq) is a special case of HSp in which the predefined histogram has an equal number of pixels in each bin.

Another common contrast enhancement technique is known as Black Point/White Point Correction (BP/WP). This linear technique includes an offset operation followed by a linear gain operation. The offset is calculated such that a certain percentage of the darkest pixel is mapped to zero output. The gain factor is calculated so that a certain percentage of the brightest post-offset pixel maps to a saturated value on the output.

While HSp and HEq provide results that are superior to BP/WP, they require significantly more computational power to calculate the various factors necessary to perform the operations. BP/WP has lower computational requirements but it does not always provide an adequate enhancement.

BRIEF DESCRIPTION OF THE DRAWINGS

The present invention is illustrated by way of example, and not by way of limitation, in the figures of the accompanying drawings in which:

FIG. 5 illustrates an exemplary input histogram;

FIGS. 10 and 11 show exemplary images that illustrate the operation of a contrast enhancement technique.

DETAILED DESCRIPTION

Figure 1:
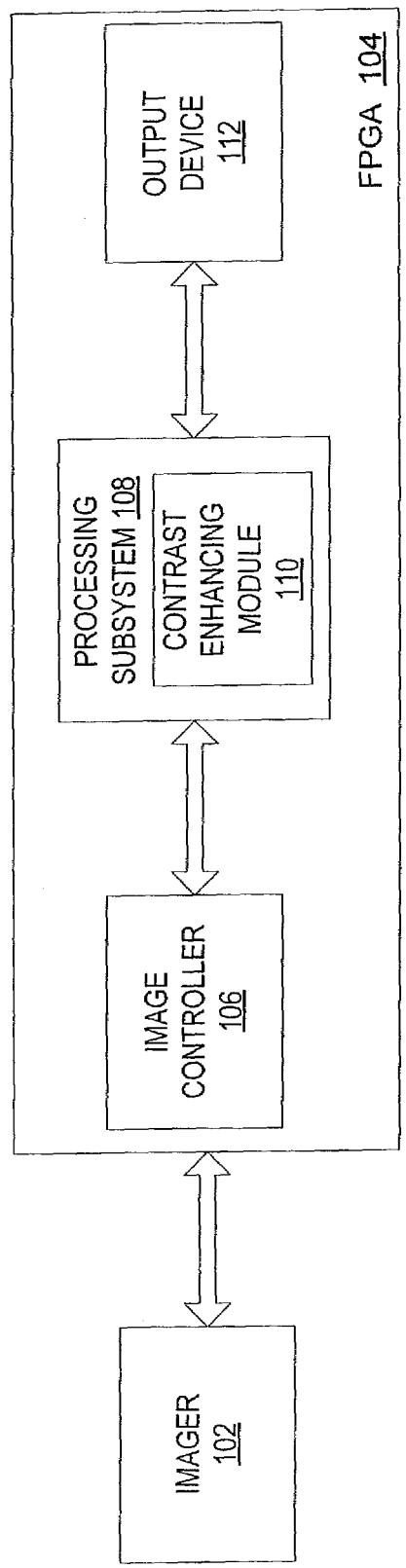
FIG. 1 is a block diagram of an exemplary video camera system in which embodiments of the present invention may operate.

In the following description, numerous specific details are set forth, such as examples of specific commands, named components, connections, number of frames, etc., in order to provide a thorough understanding of embodiments of the present invention. It will be apparent, however, to one skilled in the art that embodiments of present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the description that follow are presented in terms of algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The following detailed description includes algorithms, which will be described below. These algorithms may be implemented by hardware (e.g., analog and/or digital), firmware, or software as embodied in machine-executable instructions, which may be used to cause a general-purpose or special-purpose processor programmed with the instructions to perform the operations described herein. Alternatively, the operations may be performed by a combination of hardware, firmware, and software. The term "coupled to" as used herein may mean coupled directly to or indirectly to through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines, and each of the single signal lines may alternatively be buses. The terms "first," "second" "third" and "fourth" as used herein are meant as labels to distinguish among different pixels and/or different colors and do not have an ordinal meaning according to their numerical designation unless otherwise noted.

A method and apparatus for enhancing the contrast of an image is described. As discussed above, some existing contrast enhancing techniques such as Histogram Specification (HSp) and Histogram Equalization (HEq) provide an adequate contrast enhancement. These techniques require that the output histogram match a pre-specified histogram. In order to satisfy this rigid requirement, the above techniques must perform extensive calculations. Instead of using a pre-specified histogram, embodiments of the present invention utilize a threshold map that lists the minimum number of pixels in each output bin. This mechanism allows achieving high quality results while requiring significantly less computational power than HSp and HEq.

FIG. 1 illustrates an exemplary video camera system 100 in which embodiments of the present invention may operate. The video camera system 100 includes an imager 102, an integrated circuit such as a field programmable gate array (FPGA) 104 and an output device 112.

The imager 102 is an image sensor that captures a scene and generates image data and synchronization information. The FPGA 104 processes the image data and provides the results to the output device 112.

The FPGA may include an image controller 106 and a processing subsystem 108. The image controller 106 reads the image data provided by the imager 102 and provides input pixel information to the processing subsystem 108. The processing subsystem 108 includes various modules that perform various operations for the original image.

In one embodiment, the processing subsystem 108 includes a contrast enhancing module 110 that enhances the contrast of the original image. In one embodiment, the contrast enhancing module 110 operates by first creating a histogram for the original image based on a predefined number of bins. The histogram specifies the number of input pixels for each bin. Next, the contrast enhancing module 110 determines output pixel values based on the histogram and one or more thresholds that define the minimum number of pixels in each output bin. In one embodiment, the contrast enhancing module 110 determines the output pixel values by grouping neighboring histogram bins such that each resulting group has a pixel counter that exceeds a corresponding threshold, and calculating the output pixel values based on the grouping. As will be discussed in more detail below, in one embodiment, the calculated pixel values may further be scaled to reach the entire range of the available output graycodes. Afterwards, the contrast enhancing module 110 corrects the original image using the output pixel values.

The video camera system 100 may be used in various applications. For example, the video camera system 100 may be used in automotive applications such as forward collision and night vision applications. Alternatively, the video camera system 100 may be used for general-purpose photography (e.g., camera phone, still camera, video camera) or special-purpose photography or in other types of applications such as document scanning, microscopy, security, biometry, etc.

Figure 2:
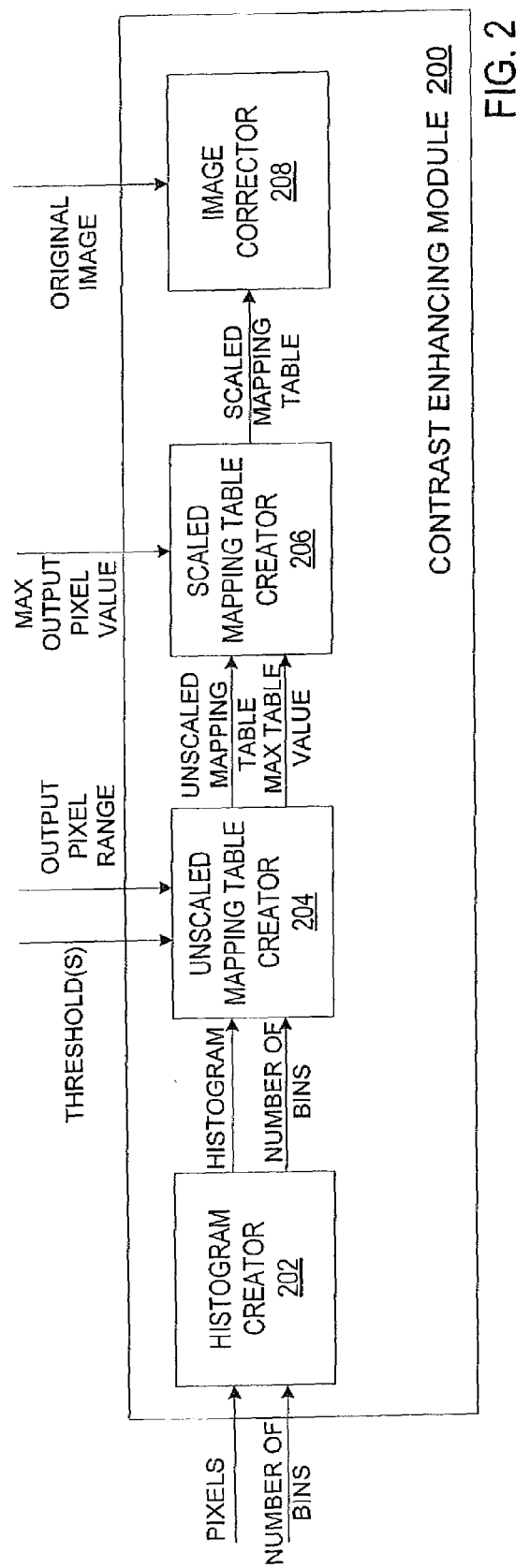
FIG. 2 is a block diagram of one embodiment of a contrast enhancing module.

FIG. 2 is a block diagram of one embodiment of a contrast enhancing module 200. The contrast enhancing module 200 may be a contrast enhancing module 110 residing in the processing subsystem 108 of FIG. 1. Alternatively, the contrast enhancing module 200 may reside in memory 1204 of a computer system 1200 that is discussed below in conjunction with FIG. 12.

The contrast enhancing module 200 may include a histogram creator 202, an unscaled mapping table creator 204, a scaled mapping table creator 206, and an image corrector 208.

The histogram creator 202 creates an input histogram for an original monochrome image using input pixel data and a predefined number of histogram bins. The larger the number of bins, the lower is the quantization error of the contrast enhancing module 200. In one embodiment, the number of bins is equal to, or greater than, the range of output pixels multiplied by 2.

The unscaled mapping table creator 204 receives the input histogram, the predefined number of bins, a range of output pixels, and one or more thresholds. The range of output pixels depends on the bit-size of output pixels. For example, 8-bit output pixels have a range of 256 (pixel values from 0 to 255). The thresholds specify the minimum number of pixels in each output bin. The thresholds may include a single value (same threshold for all bins) or multiple values (different thresholds for some or all bins). In one embodiment, the thresholds are defined manually based on empirical results. Alternatively, the thresholds are defined automatically based on characteristics of the image and the application being used.

The unscaled mapping table creator 204 groups neighboring bins from the histogram such that each resulting group has a pixel counter that exceeds a corresponding threshold, and increments the output pixel value of each subsequent group. Each resulting output pixel value is added to an unscaled mapping table that provides mapping from input pixel values to output pixel values. The unscaled mapping table creator 204 also records the maximum output value contained in the unscaled mapping table, and provides this maximum output value, together with the unscaled mapping table, to the scaled mapping table creator 206.

The scaled mapping table creator 206 calculates a scale factor by dividing a predefined maximum output value by the maximum value from the unscaled mapping table. Then, the scaled mapping table creator 206 multiplies each entry from the unsealed mapping table by the scale factor and adds the results to a scaled mapping table.

The combination of the unsealed mapping table creator 204 and the scaled mapping table creator 206 is generally referred to as a mapping table creator.

The image corrector 208 passes the original image through the scaled mapping table to correct the contrast of the original image.

Figure 3:
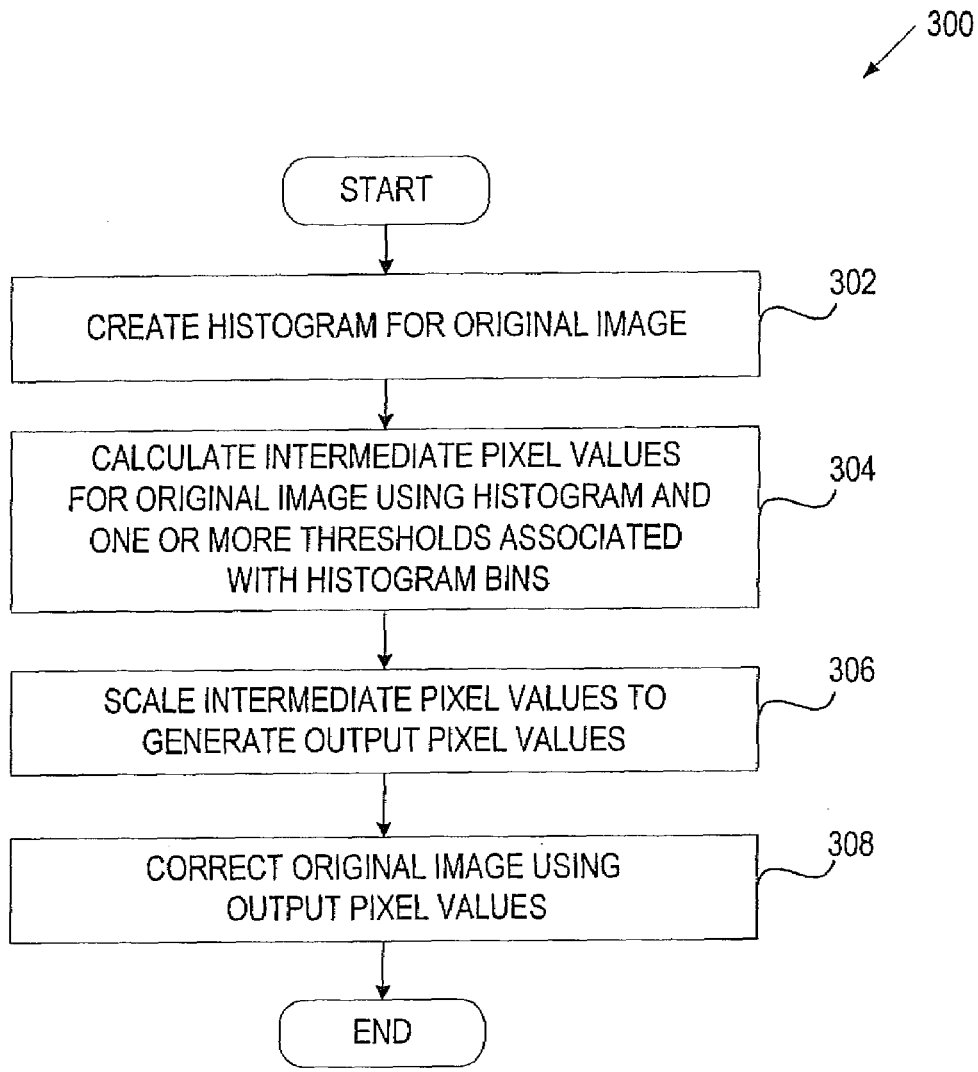
FIG. 3 is a flow diagram of one embodiment of a contrast enhancement process.

FIG. 3 is a flow diagram of one embodiment of a contrast enhancement process 300. The process may be performed by processing logic of a contrast enhancing module (e.g., contrast enhancing module 200 of FIG. 2) and may comprise hardware (e.g., circuitry, dedicated logic, programmable logic, microcode, etc.), software (such as run by a digital processing device or a general purpose computer system), or a combination of both.

Referring to FIG. 3, process 300 begins with processing logic creating an input histogram for an original image (block 302). In one embodiment, the original image is a monochrome image. One embodiment of a process for creating an input histogram will be discussed in more detail below in conjunction with FIG. 4.

At block 304, processing logic calculates output pixel values using the histogram and one or more thresholds specifying minimum number of pixels in each bin of the output histogram. In one embodiment, processing logic calculates the output pixel values by grouping neighboring bins from the histogram such that each resulting group has a pixel counter that exceeds a corresponding threshold, and incrementing the output pixel value of each subsequent group. In one embodiment, each output pixel value is added to a mapping table that maps input pixel values to output pixel values.

Grouping of neighboring bins at block 304 may result in a reduction of the range of input pixels. To take advantage of the full output range, the output pixel values calculated at block 304 should be scaled to occupy the entire range of graycodes. To distinguish between output pixel values before and after scaling, the output pixel values calculated before scaling at block 304 are referred to herein as intermediate pixel values, and the mapping table storing the intermediate pixel values is referred to herein as an unscaled mapping table. One embodiment of a process for creating an unscaled mapping table will be discussed in more detail below in conjunction with FIG. 6.

At block 306, processing logic scales the intermediate pixels values to generate final output pixel values. In one embodiment, processing logic performs the scaling using a scale factor that is calculated by dividing a predefined maximum output value over the maximum value from the unscaled mapping table. In one embodiment, processing logic adds the final output pixel values to a scaled mapping table. One embodiment of a process for creating a scaled mapping table will be discussed in more detail below in conjunction with FIG. 7.

At block 308, processing logic corrects the original image using the output pixel values calculated at block 310. One embodiment of a process for correcting an image will be discussed in more detail below in conjunction with FIG. 9.

The basic theory behind the contrast enhancing method 300 is that a contrast enhancement technique should properly utilize the available output graycodes. One way of looking at this is that no output graycode should have less than its share of pixels. In addition, conventional contrast enhancement techniques typically cause a pixel from a certain input bin to end up in a bin that is relatively close to its initial position. Next, conventional contrast enhancement techniques are usually monotonic, in that no input pixel could have an output value that is greater than another input pixel of higher value. Further, while most of the information in an image is spread across the entire input range, the image often includes key features that are at either extreme of the range. Thus, it is preferable not to lose the key features when combining the input values into fewer output values.

The contrast enhancement process 300 satisfies the major factors discussed above. In particular, the contrast enhancement process 300 operates such that (1) no output graycode has less than a specified number of pixels; (2) similar input pixels have similar output values; (3) the input to output mapping is monotonic; and (4) towards the extremes of the output range, bins may have a smaller number of pixels. In addition, contrary to conventional histogram techniques that are very complex and BP/WP that underperforms in scenes with bi-modal distribution, the contrast enhancement process 300 enhances a wide range of scenes without any user intervention (such as adjusting the threshold) while still being simple enough to implement efficiently in software, hardware or a combination of both.

Figure 4:
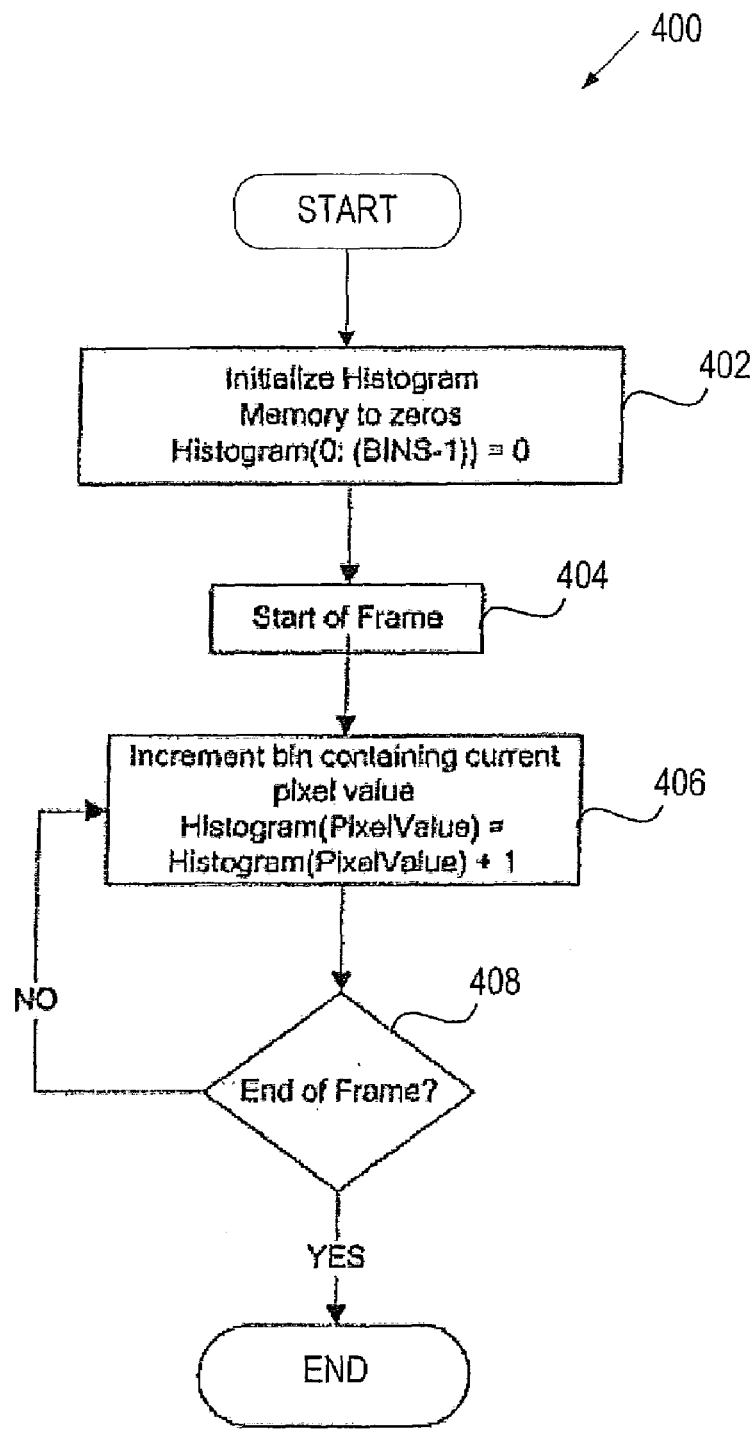
FIG. 4 is a flow diagram of one embodiment of a process for creating an input histogram.

FIG. 4 is a flow diagram of one embodiment of a process 400 for creating a histogram of an image. The process may be performed by processing logic of a contrast enhancing module (e.g., contrast enhancing module 200 of FIG. 2) and may comprise hardware (e.g., circuitry, dedicated logic, programmable logic, microcode, etc.), software (such as run by a digital processing device or a general purpose computer system), or a combination of both.

Referring to FIG. 4, processing logic begins with processing logic initializing histogram memory, which stores input pixel counters of bins, to zeros (block 402). At block 404, processing logic starts processing the frame. Next, processing logic increments an input pixel counter for a bin containing the current pixel value (block 406) and then repeats this operation until reaching the end of the frame (block 408).

The output of process 400 is an input histogram of the image containing the specified number of bins.

FIG. 5 illustrates an image 502 and an exemplary input histogram 504 created for the image 502.

Figure 6:
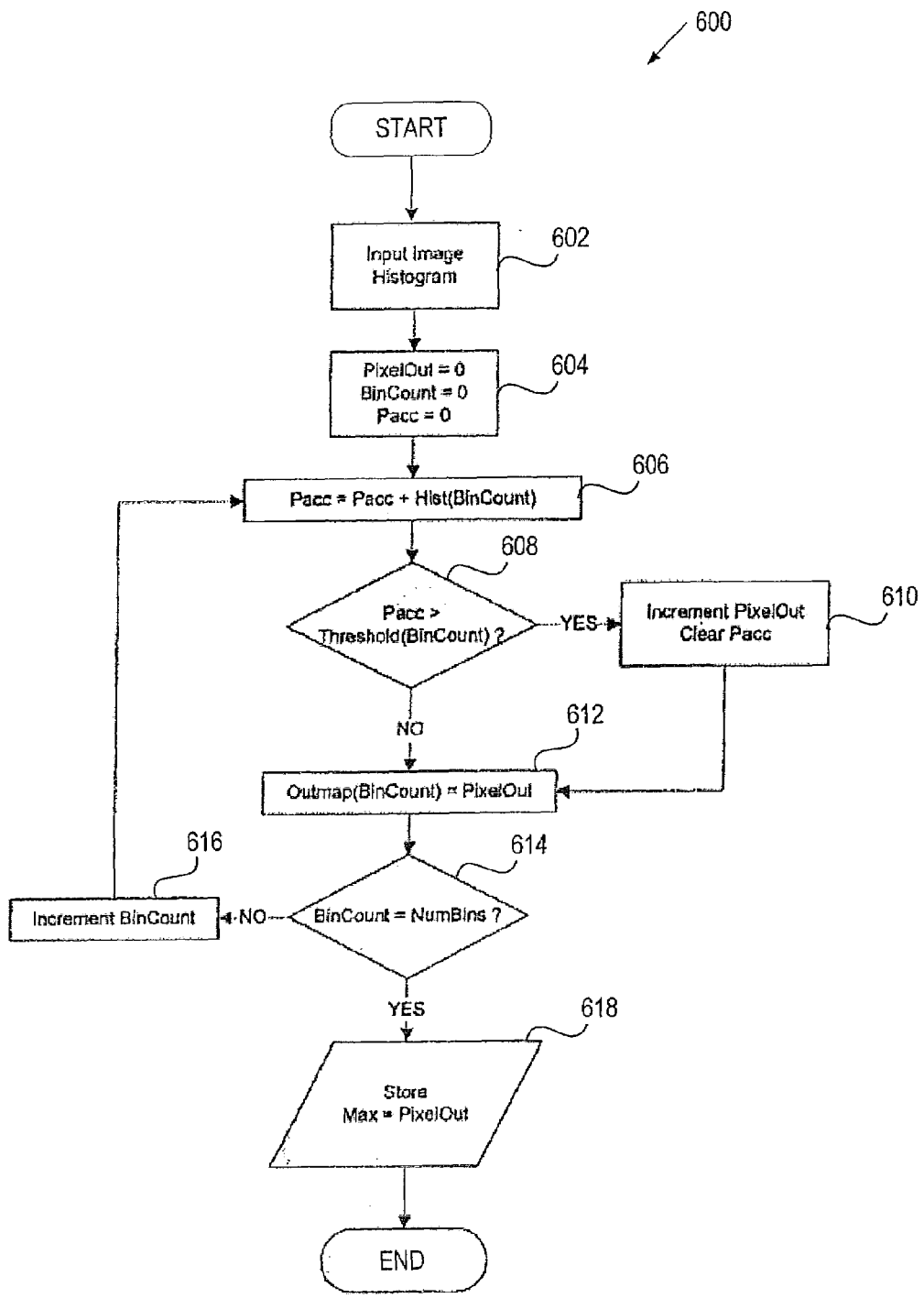
FIG. 6 is a flow diagram of one embodiment of a process for creating an unscaled mapping table.

FIG. 6 is a flow diagram of one embodiment of a process 600 for creating an unscaled mapping table. The process may be performed by processing logic of a contrast enhancing module (e.g., contrast enhancing module 200 of FIG. 2) and may comprise hardware (e.g., circuitry, dedicated logic, programmable logic, microcode, etc.), software (such as run by a digital processing device or a general purpose computer system), or a combination of both.

Referring to FIG. 6, processing logic begins with processing logic receiving an input histogram (block 602) and initializing relevant variables to zero (block 604). In one embodiment, these variables are an output pixel value (PixelOut), an input bin counter (BinCount) and a temporary accumulator for pixel counting (Pacc).

At block 606, processing logic adds pixels to the temporary accumulator Pacc, starting from the bottom of the histogram (BinCount=0).

At block 608, processing logic determines whether a corresponding minimum threshold of pixels for the current bin is exceeded. If so, processing logic increments the output pixel value (block 610) and proceeds to block 612. If not, processing logic proceeds to block 612 directly, without incrementing the output pixel value.

At block 612, processing logic stores the output pixel value in an unscaled mapping table.

At block 614, processing logic determines whether the bin count is equal to the total number of bins. If so, processing logic records the last output pixel value as the maximum value (block 618), and process 600 ends. If not, processing logic increments the bin count (block 616) and returns to block 606. Processing logic repeats blocks 606 through 614 until the entire histogram has been processed.

The outputs of process 600 are an unscaled mapping table and the maximum value from the unscaled mapping table.

Thresholds used by process 600 may vary for different scenes or be the same for all scenes. In addition, thresholds may be defined based on the number of bins in the histogram and the number of pixels in the image. In one embodiment, once the threshold is defined for a given scene, it is then scaled linearly to compensate for different numbers of bins or pixel count. For example, if a certain image were captured with a 2 megapixel sensor then it would require a threshold that is twice as high as the same scene captured with a 1 megapixel sensor since it contains twice as many pixels. Similarly, if the histogram has twice the number of bins, the threshold is cut in half since each bin would be expected to contain only half as many pixels. The determination of the proper threshold for a scene may involve more factors than just a linear relationship. Based on conducted experiments, satisfactory results can be achieved when the threshold for each bin is set at anywhere from 0.1% to 1% of the total number of pixels. For example, for a histogram of 512 bins and a video graphics array (VGA) image (640×480=310,000 pixels), a threshold between 256 and 3000 may be used. The higher the threshold, the higher is the overall gain applied to the image. Which threshold is best may be based on subjective judgment. Experiments showed good results when a threshold of 512 pixels/bin (512 bins, VGA sensor) was used to process several scenes ranging from night to day and indoor to outdoor, and a combination of the above.

Figure 7:
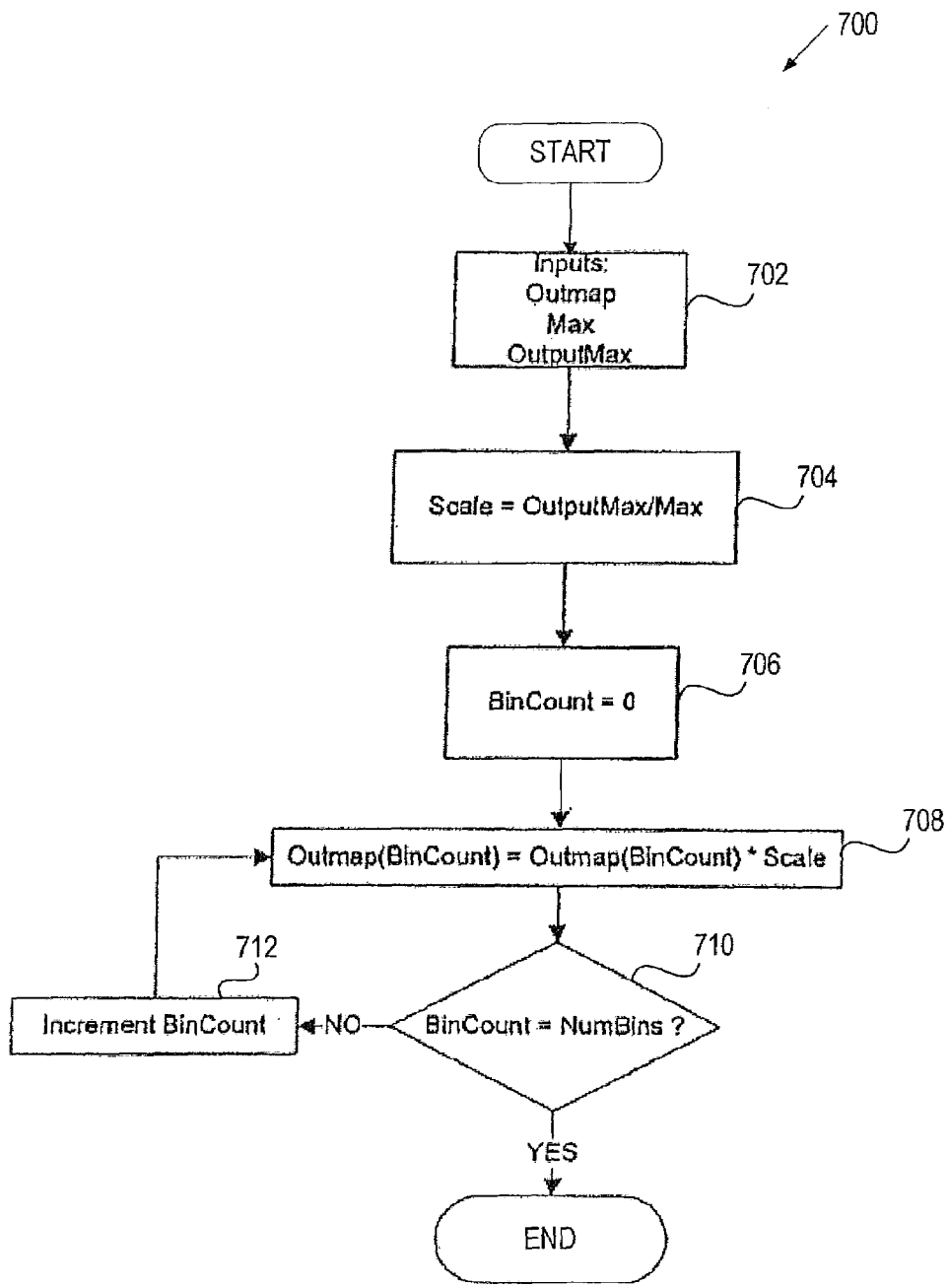
FIG. 7 is a flow diagram of one embodiment of a process for creating a scaled mapping table.

FIG. 7 is a flow diagram of one embodiment of a process 700 for creating a scaled mapping table. The process may be performed by processing logic of a contrast enhancing module (e.g., contrast enhancing module 200 of FIG. 2) and may comprise hardware (e.g., circuitry, dedicated logic, programmable logic, microcode, etc.), software (such as run by a digital processing device or a general purpose computer system), or a combination of both.

Referring to FIG. 7, processing logic begins with processing logic receiving the unscaled mapping table, the maximum value from the unscaled mapping table, and a predefined maximum output pixel value (block 702).

At block 704, processing logic calculates a scale factor such that the maximum assigned output value would map to the output saturation value when scaled.

Next, starting with the bin counter of 0 (block 706), processing logic multiplies an entry in the unscaled mapping table by the scale factor and adds the result to the scaled mapping table (block 708). Then, processing logic determines whether the entire unscaled table has been processed (block 710). If so, process 700 ends. If not processing logic increments the bin count (block 712) and returns to block 708).

Figure 8:
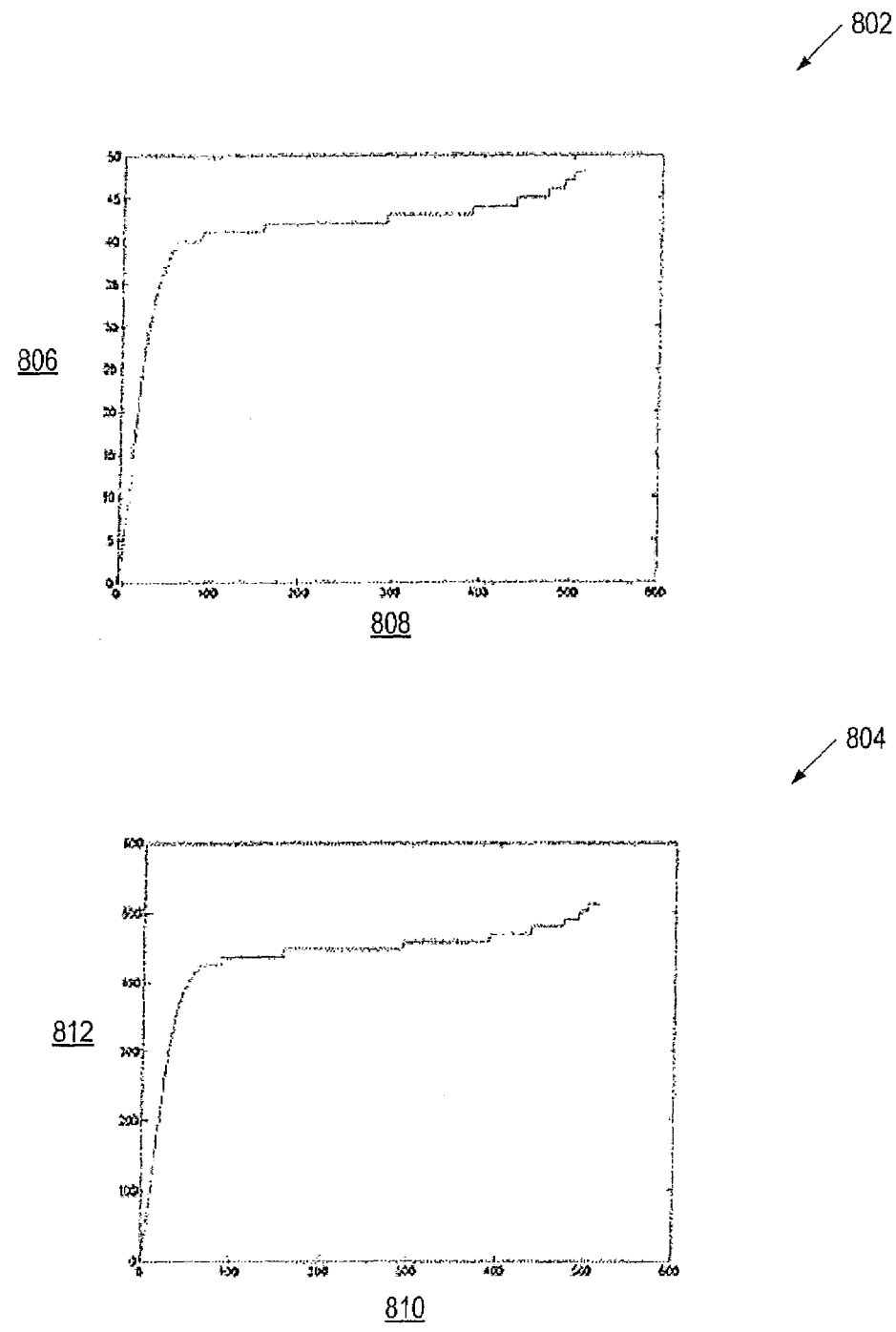
FIG. 8 illustrates exemplary unscaled and scaled mapping tables.

FIG. 8 illustrates an exemplary unscaled table 802 and an exemplary scaled table 804 that were created using a 512 bin histogram. The X-axis 808 or 810 is the input pixel value. The Y-axis 806 or 812 is the output pixel value. As shown, the range of Y-axes 806 and 812 is significantly different.

Figure 9:
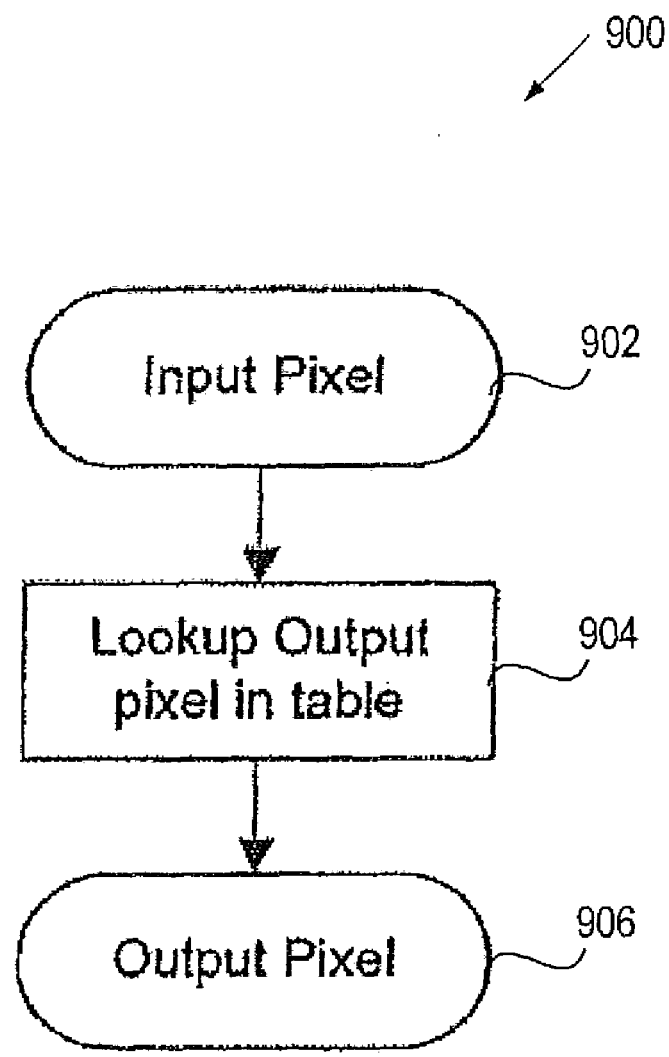
FIG. 9 is a flow diagram of one embodiment of a process for correcting an input image.

FIG. 9 is a flow diagram of one embodiment of a process 900 for correcting an image. The process may be performed by processing logic of a contrast enhancing module (e.g., contrast enhancing module 200 of FIG. 2) and may comprise hardware (e.g., circuitry, dedicated logic, programmable logic, microcode, etc.), software (such as run by a digital processing device or a general purpose computer system), or a combination of both.

Referring to FIG. 9, processing logic identifies an input pixel in the image (block 902), finds an output pixel value at the corresponding position in the scaled mapping table (block 904) and replaces the input pixel with the found output pixel value (block 906).

Process 900 is repeated for each input pixel in the image resulting in the enhanced image.

Figure 10:
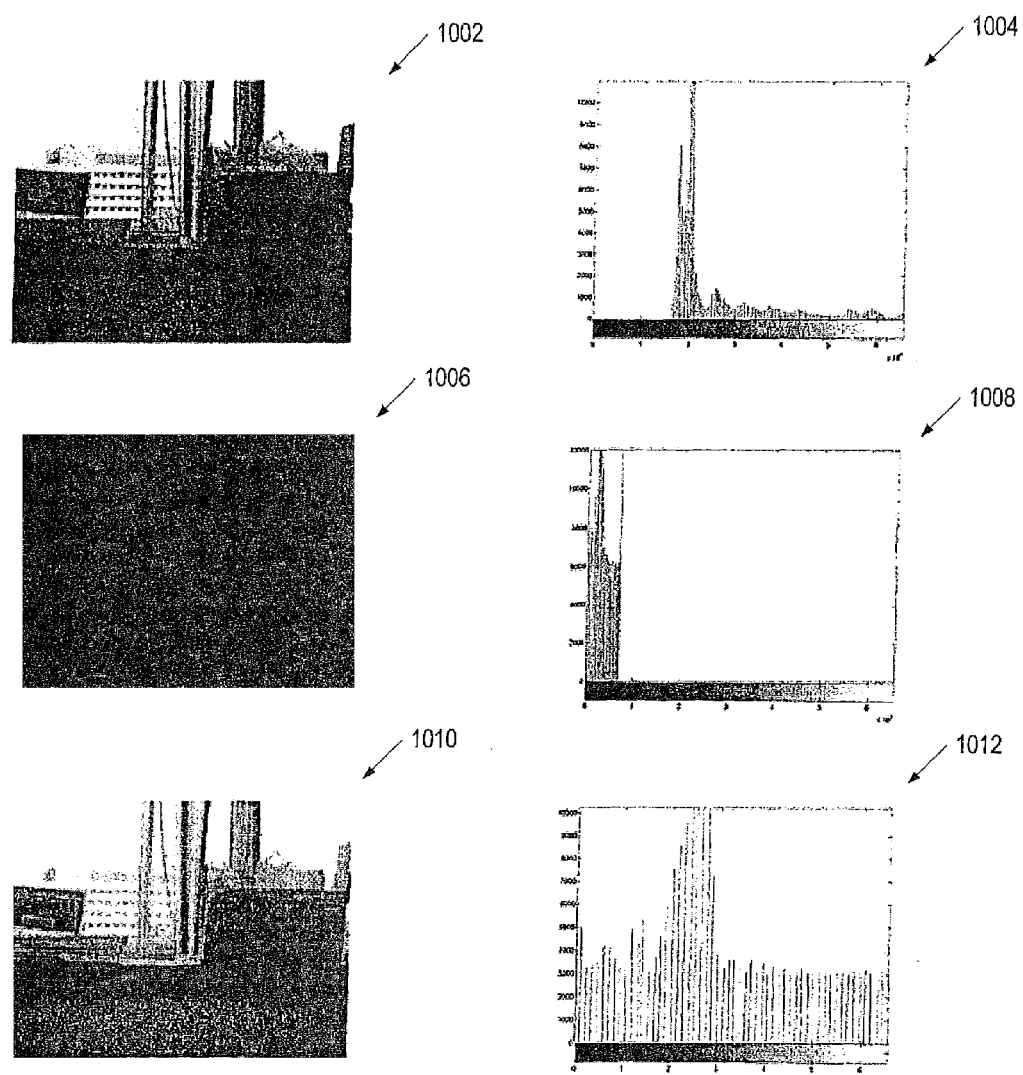

FIG. 10 illustrates a set of images and a set of corresponding histograms that illustrate the operation of the contrast enhancement technique according to some embodiments of the present invention. Image 1002 is an input image having a histogram 1004. Image 1006 was processed using an unscaled mapping table. Histogram 1008 shows a histogram of image 1006. Image 1010 was processed using a scaled mapping table. Histogram 1010 shows a histogram of image 1010.

FIG. 11 shows images illustrating the performance of the contrast enhancement technique discussed herein. Image 1102 is an original image, and image 1104 is an imaged enhanced using the contrast enhancement technique discussed herein.

Figure 12:
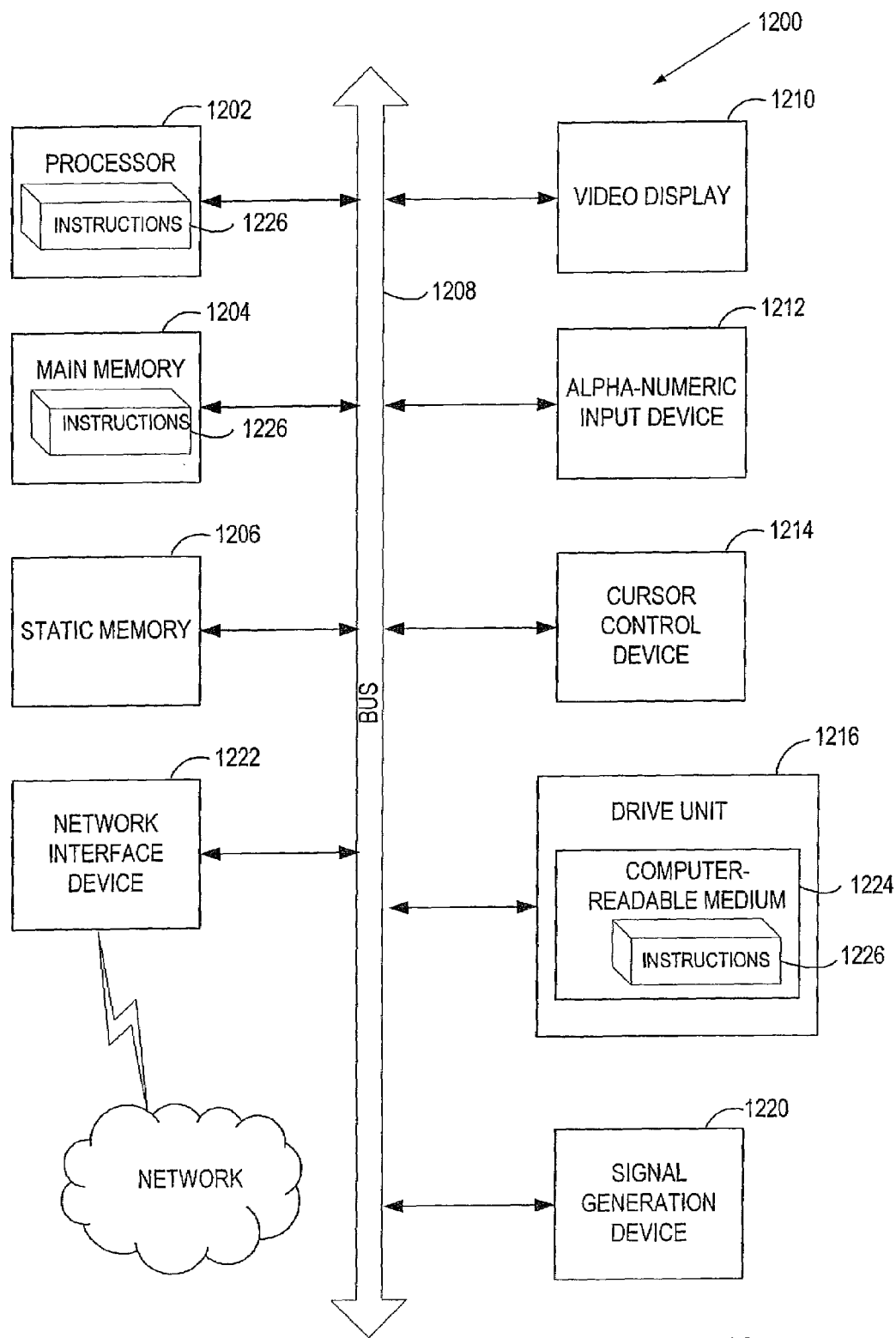
FIG. 12 is a block diagram of one embodiment of a computer system.

FIG. 12 shows a diagrammatic representation of machine in the exemplary form of a computer system 1200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. The machine may operate as, or be part of, a video camera system in which processing logic of a contrast enhancing module 200 is executed. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202 (e.g., a central processing unit (CPU), a graphics processing unit (GPU) or both), a main memory 1204 (e.g., read only memory (ROM), flash memory, dynamic random access memory (DRAM) such as synchronous DRAM (SDRAM) or Rambus DRAM (RDRAM), etc.) and a static memory 1206 (e.g., flash memory, static random access memory (SRAM), etc.), which communicate with each other via a bus 1208.

The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1220 (e.g., a speaker) and a network interface device 1222.

The disk drive unit 1216 includes a machine-readable medium 1224 on which is stored one or more sets of instructions (e.g., software 1226) embodying any one or more of the methodologies or functions described herein. The software 1226 may also reside, completely or at least partially, within the main memory 1204 and/or within the processor 1202 during execution thereof by the computer system 1200, the main memory 1204 and the processor 1202 also constituting machine-readable media.

The software 1226 may further be transmitted or received over a network 1228 via the network interface device 1222.

While the machine-readable medium 1224 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While some specific embodiments of the invention have been shown, the invention is not to be limited to these embodiments. The invention is to be understood as not limited by the specific embodiments described herein, but only by scope of the appended claims.

What is claimed is:

1. A method comprising:
electronically creating a histogram of an original image, the histogram specifying input pixel counters for a plurality of bins;
electronically analyzing a bin of pixels;
electronically determining, based upon a plurality of minimum thresholds, an output pixel value for pixel values associated with the analyzed bin, each minimum threshold defining a minimum number of pixels in a bin, each minimum threshold being associated with one or more bins;
electronically grouping, based upon a threshold, an adjacent bin of pixels with the to analyzed bin of pixels to create a grouped bin of pixels;
electronically determining an output pixel value for pixel values associated with the grouped bin of pixels;

electronically correcting pixel values of the original image associated with the grouped bin of pixels using the determined output pixel value associated with the grouped bin of pixels; and electronically correcting pixel values of the original image associated with the analyzed bin of pixels using the determined output pixel value associated with the analyzed bin of pixels.

2. The method of claim 1 wherein the histogram is created using a predefined number of the plurality of bins.

3. The method of claim 1 wherein each bin has a different minimum threshold associated therewith.

4. The method of claim 1 wherein determining the output pixel value comprises:

calculating an intermediate pixel value for the original image using the histogram and the minimum threshold associated therewith; and scaling the intermediate pixel value to generate the output pixel value.

5. The method of claim 4 wherein calculating the intermediate pixel value comprises:

incrementing an intermediate pixel value for each grouped bin group; and storing resulting intermediate pixel value in an unsealed mapping table.

6. The method of claim 5 wherein the unsealed mapping table maps a plurality of input pixel values to the plurality of intermediate pixel values.

7. The method of claim 5 further comprising:

recording a maximum intermediate pixel value.

8. The method of claim 7 wherein scaling the intermediate pixel value comprises:

calculating a scale factor by dividing a maximum output pixel value by the recorded maximum intermediate pixel value;

multiplying the intermediate pixel value by the scale factor to generate the output pixel value; and storing the output pixel value in a scaled mapping table.

9. The method of claim 8 wherein the scaled mapping table maps a plurality of input pixel values to the plurality of output pixel values.

10. The method of claim 8 wherein correcting the original image comprises:

replacing each input pixel value of the original image with a corresponding output pixel value.

11. An apparatus comprising:

a histogram creator to electronically create a histogram of an original image, the histogram specifying input pixel counters for a plurality of bins;

a mapping table creator to electronically analyze a bin of pixels;

said mapping table creator electronically determining, based upon a plurality of minimum thresholds, an output pixel value for pixel values associated with the analyzed bin, each minimum threshold defining a minimum number of pixels in a bin, each minimum threshold being associated with one or more bins;

said mapping table creator electronically grouping, based upon a threshold, an adjacent bin of pixels with the analyzed bin of pixels to create a grouped bin of pixels;

said mapping table creator electronically determining an output pixel value for pixel values associated with the grouped bin of pixels; and an image corrector to electronically correct pixels values of the original image associated with the analyzed bin of pixels using the determined output pixel value associated with the analyzed bin of pixels;

said image corrector electronically correcting pixels values of the original image associated with the grouped bin of pixels using the determined output pixel value associated with the grouped bin of pixels.

12. The apparatus of claim 11 wherein the histogram is created using a predefined number of the plurality of bins.

13. The apparatus of claim 11 wherein each bin has a different minimum threshold associated therewith.

14. The apparatus of claim 11 wherein the mapping table creator comprises:

an unsealed mapping table creator to calculate an intermediate pixel value for the original image using the histogram and the minimum threshold associated therewith; and a scaled mapping table creator to scale the intermediate pixel value to generate the output pixel value.

15. The apparatus of claim 14 wherein the unsealed mapping table creator calculates the intermediate pixel value by:

incrementing an intermediate pixel value for each grouped bin group; and storing resulting intermediate pixel values in an unsealed mapping table.

* * * * *